(12) United States Patent
Rueger et al.

(10) Patent No.: US 11,632,427 B2
(45) Date of Patent: Apr. 18, 2023

(54) SYSTEMS AND METHODS FOR MULTI-INTERFACE TRANSMISSION GATEWAY PROCESSING

(71) Applicant: Airbus (S.A.S.), Blagnac (FR)

(72) Inventors: Klaus-Werner Rueger, Eichenau (DE); Romain Desautard, Fonsorbes (FR); Zhongren Cao, Bethesda, MD (US); Anders Nilsson Plymoth, Stockholm (SE)

(73) Assignee: Airbus (S.A.S.), Blagnac (FR)

( * ) Notice: Subject to any disclaimer, the term of this patent is extended or adjusted under 35 U.S.C. 154(b) by 64 days.

(21) Appl. No.: 17/005,656

(22) Filed: Aug. 28, 2020

(65) Prior Publication Data
US 2022/0070259 A1 Mar. 3, 2022

(51) Int. Cl.
*H04L 67/12* (2022.01)
*H04W 88/16* (2009.01)
*H04W 84/12* (2009.01)

(52) U.S. Cl.
CPC .......... *H04L 67/12* (2013.01); *H04W 84/12* (2013.01); *H04W 88/16* (2013.01)

(58) Field of Classification Search
CPC ........ H04L 67/12; H04W 84/12; H04W 88/16
See application file for complete search history.

(56) References Cited

U.S. PATENT DOCUMENTS

| | | | |
|---|---|---|---|
| 2017/0358223 A1 | 12/2017 | Priest | |
| 2019/0019418 A1* | 1/2019 | Tantardini | ............ G08G 5/0086 |
| 2019/0342225 A1 | 11/2019 | Sanghi et al. | |
| 2020/0005651 A1 | 1/2020 | Priest | |
| 2020/0218251 A1* | 7/2020 | Ying | .................... G05D 1/0016 |
| 2021/0124832 A1 | 4/2021 | Sadjadpour et al. | |
| 2022/0069899 A1 | 3/2022 | Rueger et al. | |

OTHER PUBLICATIONS

Secinti, Gokhan et al, "Resilient end-to-end connectivity for software defined unmanned aerial vehicular networks," 2017 IEEE 28th Annual International Symposium on Persona, Indoor, and Mobile Radio Communications, PIMRC, Oct. 8, 2017.
Saxena, Paresh et al, "Resilient Hybrid SatCom and Terrestrial Networking for Unmanned Aerial vehicles", IEEE Infocom 2020—IEEE Conferences on Computer Communications Workshops, Jul. 6, 2020.
European Search Report for Application No. 21193423 dated Jan. 31, 2022.
Non-Final Office Action for U.S. Appl. No. 17/407,978 dated Dec. 22, 2022.

* cited by examiner

*Primary Examiner* — Jae Y Lee
(74) *Attorney, Agent, or Firm* — KDW Firm PLLC

(57) ABSTRACT

Systems and methods for multi-interface transmission gateway processing. In some embodiments, the system includes one or more vehicles, each including at least one vehicle gateway, and wireless communication interfaces, at least one management gateway in communication with the vehicle gateway of each vehicle through at least one of the wireless communication interfaces, and one or more management servers in communication with each of the one or more vehicles via the management gateway, wherein the one or more management servers is configured to monitor or manage a status of each of the one or more vehicles. To facilitate reliable and low latency communication between the various devices, an overlay network is maintained over the wireless communication interfaces, and each device is assigned a virtual network interface for inter-device communication purposes.

22 Claims, 11 Drawing Sheets

SYSTEMS AND METHODS FOR MULTI-INTERFACE TRANSMISSION GATEWAY PROCESSING

TECHNICAL FIELD

The subject matter disclosed herein relates generally to wireless network data communications. More particularly, the subject matter disclosed herein relates to wireless network data communications overlay networks.

BACKGROUND

Around the world, the use of unmanned aerial systems (UAS) (i.e., commercial, military, and personal drones or other unmanned aerial vehicles) is growing very fast. Along with the increased prevalence of UAS comes potential safety issues between UAS and airlines and aerospace industry vehicles. For airlines and the aerospace industry, safety is paramount and aerial vehicles (i.e., especially commercial aircraft) are heavily regulated. An example environment in which UAS and manned aircraft, such as helicopters H and airplanes A, coexist is shown in FIG. 1A. This figure illustrates the possible security issues that could come into play, especially if UAS and manned aircraft do not communicate with one another or if UAS accidentally interferes with manned aircraft locations. For example, a major safety issue could be presented in the scenario where an autonomous drone enters the airspace surround an airport on accident (i.e., a bug in the autonomous flying software causes it to fly in the wrong direction). FIG. 1B illustrates another possible safety issue where several UAS, some being controlled by a human, other being controlled by remote communications. In this scenario, the UAS close to the helicopter H could potentially interfere with or crash into the helicopter H causing the helicopter H to malfunction, be damaged, or even crash, seriously or fatally injuring its passengers and crew.

Recently, the industry, NASA, and the Federal Aviation Administration (FAA) have begun researching and implementing unmanned traffic management (UTM) systems to help manage communications and flights of UAS beyond line-of-sight at altitudes under 400 feet above ground level. UTM is separate from, but complementary to the FAA's Air Traffic Management systems used for manned aircraft. The plan for UTM is to make it a scalable and distributed system for large-scale and real-time UAS flight monitoring and controls. In order to communicate properly and allow for continuous monitoring and controls of the UAS devices, the communication systems between the UTM devices (i.e., monitoring and controlling devices) and the UAS requires a highly reliable and low-latency communication system.

SUMMARY

In accordance with this disclosure systems and methods for multi-interface transmission gateway processing are provided. In some embodiments, the systems and methods of the present disclosure provide reliable and low-latency communication paths by intelligently incorporating redundancy into the UTM network access. In some embodiments, systems and methods of the present disclosure leverage a plurality of independent wireless network service providers to cooperatively and concurrently transmit UTM information.

In one aspect, a system for multi-interface transmission gateway processing is provided, the system comprising one or more vehicles, each comprising at least one vehicle gateway; and a plurality of wireless communication interfaces; and one or more management network devices in communication with at least one vehicle of the one or more vehicles via at least one interface of the plurality of wireless communication interfaces of the at least one vehicle; wherein the one or more management network devices is configured to monitor or manage a status of at least one vehicle of the one or more vehicles.

In some embodiments, each vehicle gateway is configured to maintain a first virtual network interface and the one or more management devices is configured to maintain a second virtual network interface. In some embodiments, the system is configured to maintain an overlay network between the first virtual network interface of at least one of the one or more vehicles and the second virtual network interface. the system is configured to maintain an overlay network between the first virtual network interface of at least one of the one or more vehicles and the second virtual network interface.

In some embodiments, the system is configured to maintain the overlay network over at least one wireless communication interface of the plurality of wireless communication interfaces of the at least one vehicle such that if any of the plurality of wireless communication interfaces fails on a given vehicle, the overlay network is maintained and communication between the given vehicle and the one or more management network devices is maintained. In some embodiments, computer applications communicating between the at least one vehicle and the one or more management network devices, including communications configured for monitoring and managing the status of the at least one vehicle, are configured to communicate, using network packets, over the overlay network between the first virtual network interface of the at least one vehicle and the second virtual network interface of the one or more management network devices using network packets.

In some embodiments, the one or more management network devices comprises at least one of the one or more vehicles, a management server, or a management gateway. In some embodiments, each of the one or more vehicles is configured to encode application network packets into coded network packets before transmitting the coded network packets to the one or more management network devices and decode received coded network packets received from the one or more management network devices; and wherein each of the one or more management network devices is configured to encode application network packets into coded network packets before transmitting the coded network packets to the one or more vehicles and decode received coded network packets received from the one or more vehicles.

In some embodiments, the one or more vehicles and one or more management network devices are each configured to encode the application network packets by mapping each application network packet to one or more coded symbols; wherein the one or more vehicles and one or more management network devices are further configured to insert the one or more coded symbols into one or more coded network packets; and wherein the one or more vehicles and one or more management network devices are further configured to transmit the coded network packets over one or more of the plurality of wireless communication interfaces. In some embodiments, the one or more vehicles and one or more management network devices are each configured to decode received coded network packets by extracting the multiple coded symbols from the received coded network packets to recover the application network packets that were encoded into one or more coded symbols; and wherein the system is configured to recover the application network packets using erasure decoding and then forward the recovered application network packets to a corresponding receiving computer application.

In some embodiments, each of the one or more vehicles is a drone, an unmanned aerial system, an unmanned system, or any manned or unmanned autonomous system that requires reliable communications with one or more remote management network devices. In some embodiments, the plurality of wireless communication interfaces comprises one or more of the following: one or more cellular wireless network interfaces, one or more satellite network interfaces, one or more vehicle-to-vehicle network interfaces, one or more air-to-ground network interfaces, and one or more Wi-Fi network interfaces.

In another aspect, a method for multi-interface transmission gateway processing, the method comprising: providing one or more management network devices in communication with at least one vehicle of a set of one or more vehicles, each vehicle comprising: at least one vehicle gateway; and a plurality of wireless communication interfaces; and monitoring or managing a status of each of the at least one vehicle using the management network device. In some embodiments, the method further comprises maintaining a first virtual network interface at each vehicle gateway; and maintaining a second virtual network interface at the one or more management network device.

In some embodiments, the method further comprises maintaining an overlay network between the first virtual network interface of each of the one or more vehicles and the second virtual network interface. In some embodiments, the method further comprises maintaining the overlay network over at least one of the plurality of wireless communication interfaces of the at least one vehicle such that if any of the plurality of wireless communication interfaces fails on a given vehicle, the overlay network is maintained and communication between the given vehicle and the one or more management network devices is maintained. In some embodiments, computer applications communicating between the at least one vehicle and the one or more management network devices, including communications configured for monitoring and managing the at least one vehicle, are configured to communicate, using network packets, over the overlay network between the first virtual network interface of a corresponding vehicle and the second virtual network interface of the one or more management network devices.

In some embodiments, the one or more management network devices comprises at least one of the one or more vehicles, a management server, or a management gateway. In some embodiments, the method further comprises encoding, at each of the one or more vehicles, application network packets into coded network packets before transmitting the application network packets to the one or more management network devices and decoding received coded network packets received from the one or more management network devices; and encoding, at the one or more management network devices, application network packets into coded network packets before transmitting the coded network packets to the one or more vehicles and decoding received coded network packets received from the one or more vehicles.

In some embodiments, encoding comprises: mapping each application network packet to one or more coded symbols; inserting, at the one or more vehicles or one or more management network devices, the one or more coded symbols into one or more coded network packets; and transmitting, from the one or more vehicles or one or more management network devices, the coded network packets over one or more of the plurality of wireless communication interfaces. In some embodiments, decoding comprises: extracting the one or more coded symbols from the received coded network packets and recovering the application network packets that were encoded; recovering the application network packets using erasure decoding; and forwarding the recovered application network packets to a corresponding receiving computer application of the one or more vehicles or one or more management network devices.

In some embodiments, each of the one or more vehicles is a drone, an unmanned aerial system, an unmanned system, or any manned or unmanned autonomous system that requires reliable communications with one or more remote management network devices. In some embodiments, the plurality of wireless communication interfaces comprises one or more of the following: one or more cellular wireless network interfaces, one or more satellite network interfaces, one or more vehicle-to-vehicle network interfaces, one or more air-to-ground network interfaces, and one or more Wi-Fi network interfaces.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides systems and methods for multi-interface transmission gateway processing, which can be used to mitigate some of safety concerns discussed above. An important goal of this type of processing is to facilitate reliable and low-latency communication between the UAS and UTM to decrease the likelihood of accidents by: 1) informing the UTM about in-flight route planning and re-planning; 2) reporting, sharing, and monitoring routine flight statuses; and 3) handling contingencies or emergencies remotely. Thus, the UTM to UAS communication system is a safety-critical system for UAS operators. Those having ordinary skill in the art will appreciate that the systems and methods described herein can also be utilized by non-aerial vehicles as well, such as, for example, automobiles, trains, buses, bicycles, boats, trams, and any other vehicle capable of hosting some of the systems described herein.

As described herein, in order to effectively monitor in-flight route details, routine flight status(es), and handle contingencies or emergencies remotely, continuous and reliable communications between vehicles (i.e., including aerial vehicles) and one or more centralized or distributed management servers used to monitor the vehicles is essential. In some embodiments, the servers can be centralized in order to maintain a single location where data regarding the status of the vehicles can be maintained. Alternatively, the servers can be distributed, meaning there are several severs located in various locations around an area, and the monitoring of the vehicles is performed by each distributed server and then, preferably, the distributed servers would share with each other the data they have collected.

Figure 1A:
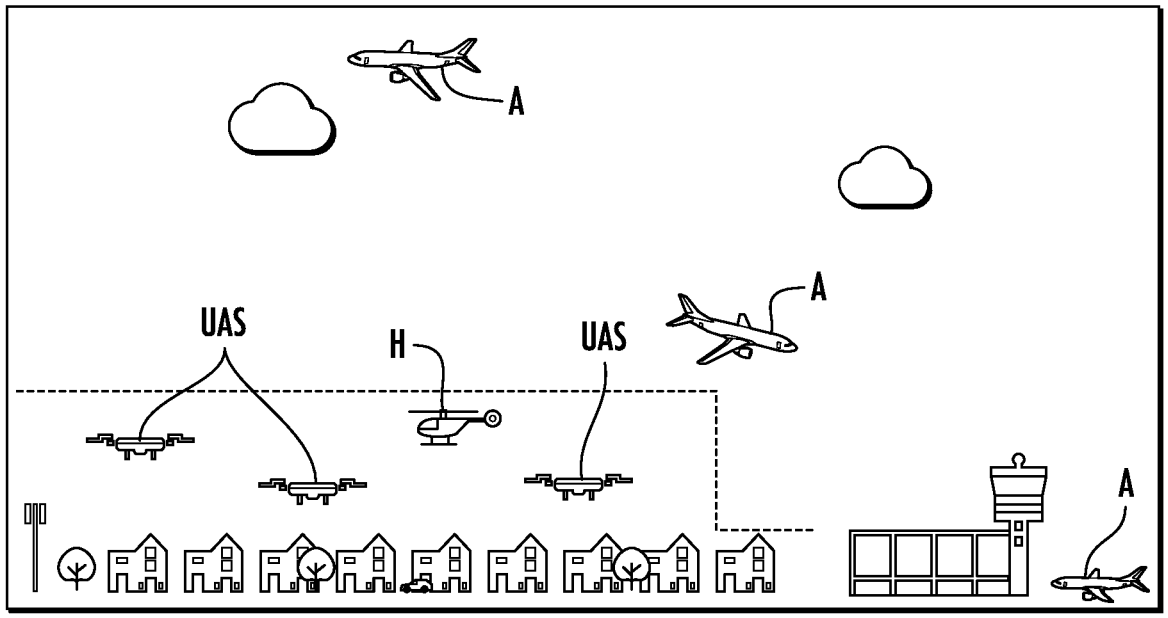
FIG. 1A and FIG. 1B illustrate example environments including various aerial vehicles flying and otherwise interacting in typical patterns and locations usually associated with aircraft and other flying vehicles.
Figure 1B:
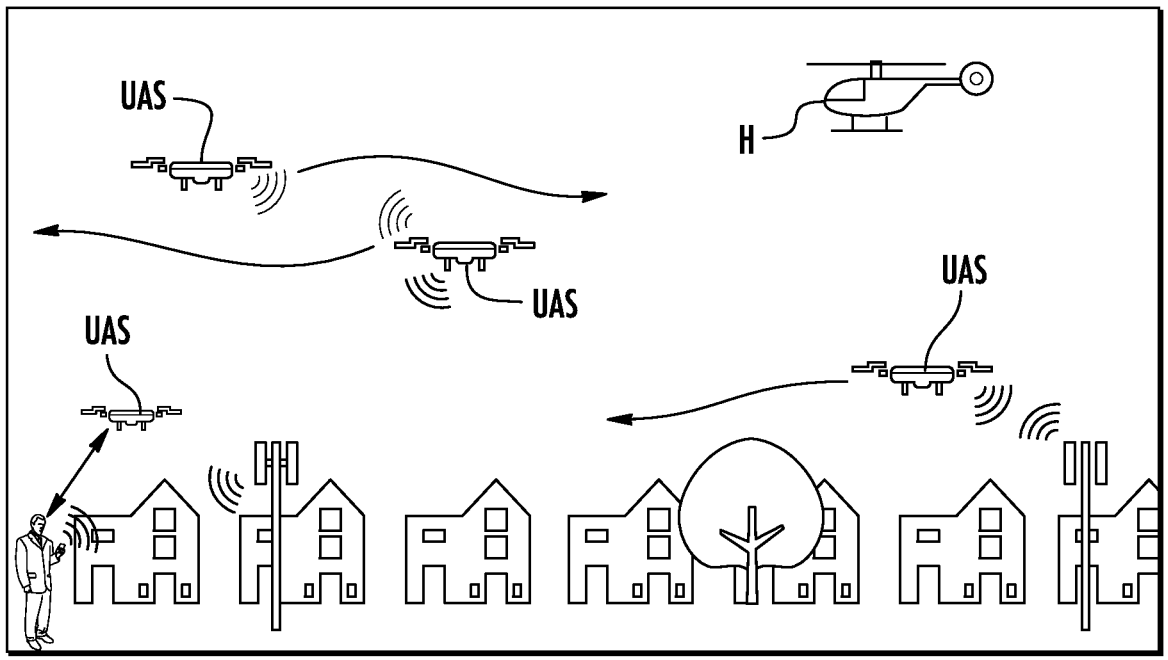
Figure 2A:
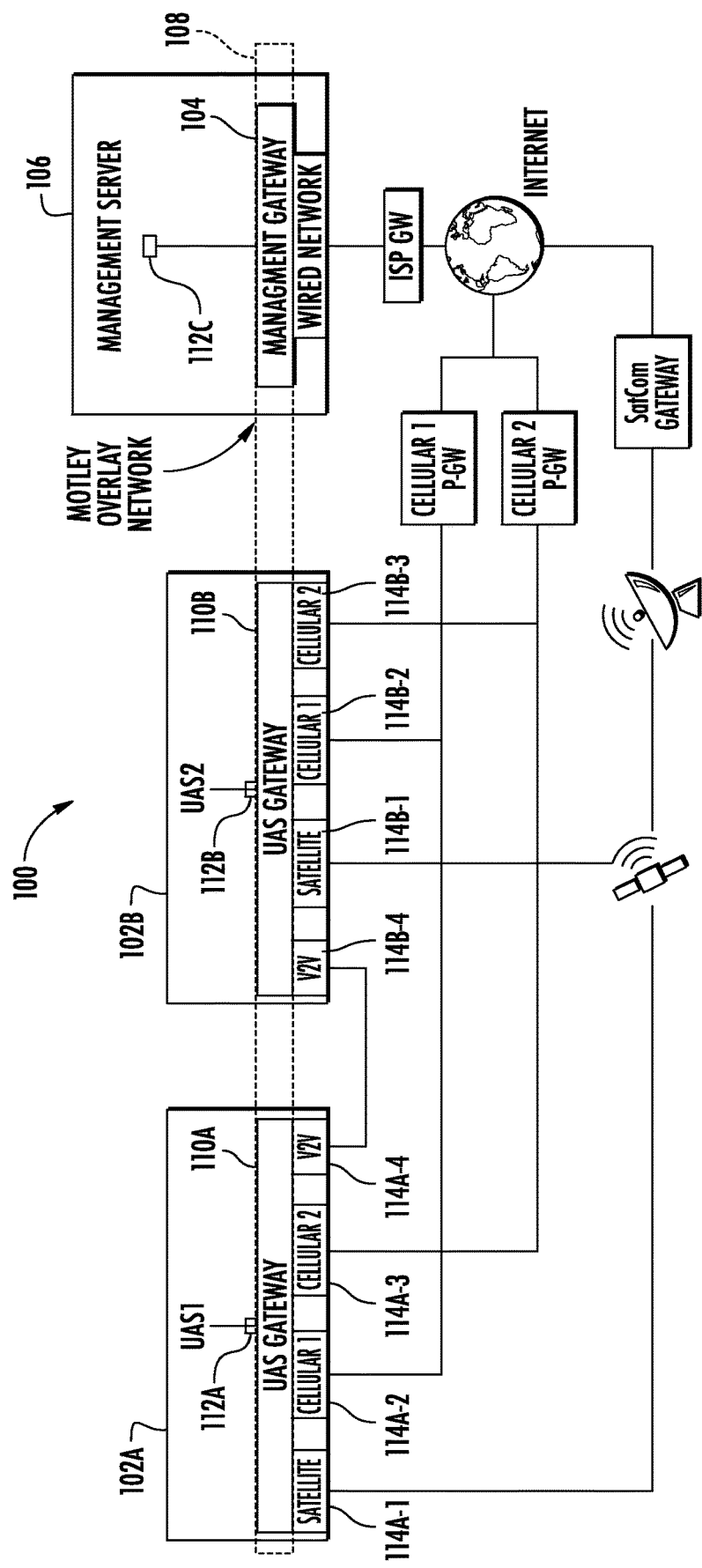
FIG. 2A, FIG. 2B, FIG. 2C, and FIG. 2D illustrate example network topology diagrams according to embodiments of the present disclosure.

FIG. 2A illustrates an example network topology of a system 100 for multi-interface transmission gateway processing. In some embodiments, the system 100 comprises a first UAS vehicle 102A and a second UAS vehicle 102B connected via various wireless interfaces to a management server 106 via the Internet and a management gateway 104. Although the illustration in FIG. 2A depicts the management server 106 and the management gateway 104 as a combined network device, in some embodiments of the present disclosure, the management server 106 and the management gateway 104 can be separate network devices and have different virtual network interfaces 112 instead of having a shared virtual network interface 112, as described herein. Additionally, in some embodiments, the management server 106 can be located on a UAS vehicle 102. In such an embodiment, the management server 106 would be among the other UAS vehicles 102 in a group. Additionally, as illustrated in the below description and later figures, those having ordinary skill in the art will appreciate that the management server 106 can be in multiple locations, such as for example, in a distributed server environment, where multiple physical servers are in different physical locations, but act logically as one server or as multiple redundant servers. For example and without limitation, the management server 106 can be located on one or more of the UAS vehicles 102, it can be located on another vehicle or other flying or non-flying station, it can be located on the ground or in space, or any other suitable location. Additionally, the management gateway 104 can be similarly located as the management server 106. The description and figures below detail some possible implementations of the subject matter of the pending disclosure. However, these embodiments should be viewed as being descriptive and illustrative only, not restrictive.

In some embodiments, the system 100 comprises one or more UAS vehicles similar to and having some of the same features as first UAS vehicle 102A and second UAS vehicle 102B. In some embodiments, each of the first UAS vehicle 102A and the second UAS vehicle 102B comprise a first UAS gateway 110A and a second UAS gateway 110B, respectively. Each UAS gateway 110 can comprise one or more processors configured to manage not only operations of the UAS 102, but also communications between the UAS 102 and the management server 106, including any intermediate devices therebetween. In some embodiments, each UAS gateway 110 can be incorporated into already existing processor(s) aboard the UAS vehicle 102, separate processors on the UAS vehicle 102, or a combination of both. In some embodiments, each of the first UAS vehicle 102A and the second UAS vehicle 102B can have one or more wireless network interfaces. Each of these wireless network interfaces can be, for example and without limitation, satellite interfaces (i.e. a low earth orbit (LEO) or other appropriate satellite communication interface), cellular wireless network interfaces (i.e. LTE, 4G, 5G, 3G, 2G, etc.), Wi-Fi interfaces, Bluetooth interfaces, vehicle-to-vehicle interfaces (i.e., that could be Wi-Fi or any other type of wireless or wired interface described herein), ISM A2G interfaces, EAN network interfaces, etc.

With respect to the present disclosure, ISM A2G interfaces are industrial, scientific, and medical (ISM) air-to-ground (A2G) interfaces communicating and operating in a portion of the radio spectrum reserved internationally for industrial, scientific, and medical purposes, other than telecommunications. Moreover, A2G is two-way communication between aircraft (including UAS vehicles) and stations of locations on the surface of the Earth. The European Aviation Network (EAN) is a hybrid network used as a backhaul for inflight WiFi for domestic flights within Europe and contains an LTE (or other wireless communications) ground network supported by a satellite connection. In some embodiments, for example and without limitation, at least one of the network interfaces or network links can be a Safety link. A Safety link, in some embodiments, can be one or more interfaces related to an aeronautical mobile route (R)* service or aeronautical mobile satellite route (R)* service. A Safety link is typically used for communications to ensure the safety of life of humans. Some examples could be air traffic control communication and radio navigation. In some cases, these devices can be an aeronautical mobile service reserved for communications relating to safety and regularity of flight, primarily along national or international civil air routes. Additionally, to ensure that aeronautical communications, navigation, and surveillance (CNS) systems, which provide safety-of-life services to aviation, operate in frequency bands that are properly allocated for use by aviation, with the objective of operating in spectrum allocated to an appropriate aeronautical safety service, and suitably protected from harmful interference that can be caused by other systems using the same or nearby frequency bands. In some embodiments, the interfaces can be wired and not wireless interfaces. In some embodiments, every interface comprises an appropriate antenna or other hardware device used to facilitate communication via the interface.

For example, and without limitation, in some embodiments, the network interfaces can include the first UAS vehicle 102A having a satellite network interface 114A-1 configured to connect the first UAS vehicle 102A to a satellite communication gateway connected to the Internet. Furthermore, in some embodiments, the first UAS vehicle 102A can have one or more cellular network interfaces, such as, for example, first cellular network interface 114A-2 and second cellular network interface 114A-3. Each of these cellular network interfaces can be connected to the Internet using a mobile communications network such as, for example, an LTE network, 3G network, 2G network, 5G network, or any other type of mobile communications network known to those having ordinary skill in the art. In some embodiments, the first UAS vehicle 102A can also have a first vehicle-to-vehicle interface 114A-4, which can be a Wi-Fi or other wireless network interface that can connect the first UAS vehicle 102A to a second vehicle-to-vehicle interface 114B-4. Those having ordinary skill in the art will appreciate that each UAS vehicle in the system of the present disclosure can have one, some, or all of the types of interfaces described herein, including one or more of the same types of interface.

In some embodiments, the satellite and cellular network interfaces can be connected to the Internet via cellular and SatCom gateways, respectively. Additionally, each of the first UAS vehicle 102A and the second UAS vehicle 102B maintain a first virtual network interface 112A and a second virtual network interface 112B, respectively. In some embodiments, each of the first virtual network interface 112A and a second virtual network interface 112B can be virtual Ethernet interfaces. These virtual network interfaces are designed such that the UAS vehicles can communicate with other devices using the virtual network interface as the source and destination of the traffic. This feature will be described in more detail herein.

In the example illustrated in FIG. 2A, each of the cellular and SatCom gateways connect to the management gateway 104 via the Internet connection and the internet service provider (ISP) gateway. The management server 106 comprises a third virtual network interface 112C and is configured to operate as the unmanned traffic management (UTM) server. In this scenario, both applications operating on the management server 106 and the management gateway 104 would use the third virtual network interface 112C as the source of traffic they send and they would both receive traffic at the third virtual network interface 112C, as well. In its capacity as the UTM server, the management server 106 is configured to receive and monitor communications (i.e., network or internet protocol (IP) packets) from the UAS vehicles 102 comprising information regarding at least in-flight route planning and re-planning, reporting, sharing, and monitoring routine flight statuses, and contingencies or emergencies of the UAS vehicles 102. In addition to the UTM operations, the management server 106 and/or combined management server 106 and management gateway 104 can be configured to perform a large range of distributed management applications. In other words, the management server 106 can be a UTM server and maintain and perform a range of distributed data network applications. In some embodiments, the management gateway 104 is a separate network device from the management server 106 and the management gateway 104 comprises a fourth virtual network interface 112D and is configured to handle communications between each of the UAS vehicles 102 and the management server 106.

In order to efficiently exchange these communications, it is essential that there is a very reliable connection path between the UAS vehicles 102 and the management server 106. In order to provide such a very reliable connection, in some embodiments, the system 100 comprises an overlay network 108 formed and maintained between the first UAS gateway 110A, the second UAS gateway 110B (and any other UAS vehicle gateways), and the management gateway 104. The overlay network 108 is a virtual network created and maintained in software between the various computing devices (i.e. gateways and server(s)). The overlay network 108 is built and maintained between the devices over the several network interfaces 114, through the Internet, ISP gateway, and the management gateway 104. Although the Internet is used as a connecting network that connects the UAS vehicles to the management server 106, those having ordinary skill in the art will appreciate that other networks can be used as well, such as WANs, fiber networks, and various other non-Internet based networks. For example, if designed properly, a wireless LAN could be created in a location to communicate with the UAS vehicles and then a connection directly connecting the management server 106 to the wireless LAN can be implemented, cutting out the Internet as a connecting network.

Figure 2B:
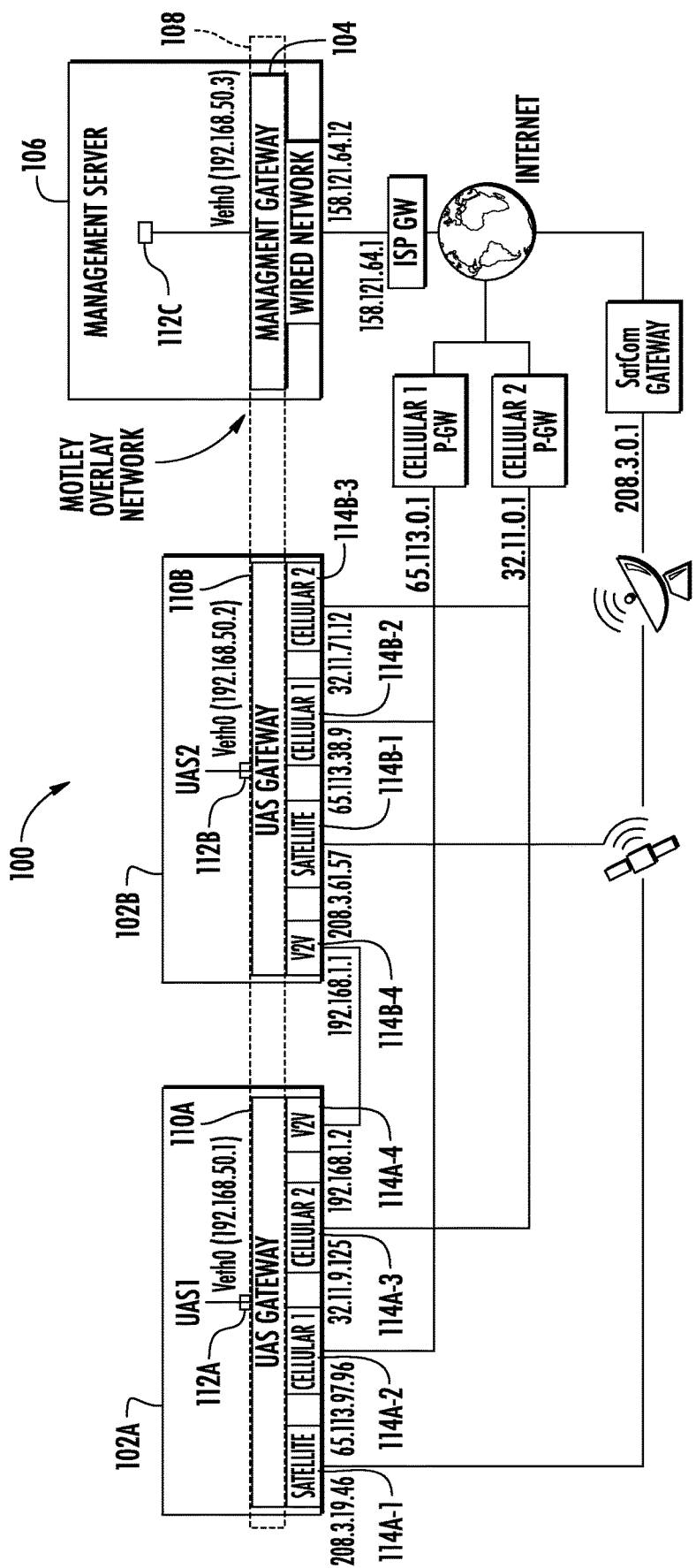

Turning next to FIG. 2B, which illustrates the same network topology of the system 100 as FIG. 2A, except in this figure, each of the interfaces discussed above have IP addresses assigned to them. Those having ordinary skill in the art will appreciate that one purpose of the overlay network 108 is to effectively create an extended logical layer-2 (i.e., layer-2 of the well known in the art OSI networking model) network across the various networks interconnected via the Internet. Typically, local area networks (LANs) separated by locations and/or layer-3 routed networks and/or the Internet cannot be layer-2 adjacent to each other (i.e., network devices, including virtual network interfaces, being in the same IP subnet or virtual local area network (VLAN)). That is, unless the LANs are connected by a virtual private network (VPN) or some other sort of overlay network that extends the layer-2 domain of the various LAN locations over the Internet. What extension of the layer-2 domain allows the network designer to do is have several different networks in different locations, connected by the Internet (or some other routed network), all within the same IP subnet.

Thus, in effect, the overlay network 108 of the present disclosure, makes it such that the virtual network interfaces of all of the UAS vehicles 102, the management gateway 104, and the management server 106 are layer-2 adjacent to each other, and thus, all in the same IP subnet. As shown in FIG. 2B, the first UAS vehicle 102A has the first virtual network interface 112A with an IP address of 192.168.50.1, the second UAS vehicle 102B has the second virtual network interface 112B with an IP address of 192.168.50.2, and the management gateway 104 has the third virtual network interface 112C with an IP address of 192.168.50.3. With the assumption that this is a /24 network or subnet, each of these devices is within the 192.168.50.0/24 subnet.

With the above in mind, those having ordinary skill in the art will appreciate that other network segmenting strategies are also possible with the present subject matter. For example, and without limitation, each of the virtual network interfaces can be assigned IP addresses in different subnets, instead of the same subnet. The main purpose of the overlay network is to effectively establish a homogenous virtual network over multiple heterogenous physical networks. Thus, any suitable network segmentation designs can work, not just assigning the virtual network interfaces in the same subnet.

Typically, network devices, such as, for example, the first UAS gateway 110A, have a single layer-3 network interface. This means they have one IP address for the device and one interface or one connection that helps them get out to the Internet or other network. However, this single interface is potentially unreliable. Say for example, as a hypothetical, a single cellular network interface is given to the first UAS gateway 110A, and this one interface goes down, for example, a service provider has an outage. This would mean that the cellular network interface would go down and the first UAS gateway 110A would have no way of communicating with the management server 106. This creates a reliability issue because the applications communicating between the UAS vehicles and the management server 106 would no longer be able to exchange network packets and the overlay network 108 would go down. Thus, in some embodiments of the present disclosure, the system is configured such that communication between the UAS vehicles and the management server 106 is maintained over a plurality of network interfaces because such a design is more reliable. If one or more of the network interfaces goes down, another interface can still be used to handle the communication of the traffic.

In some embodiments, for example, if the satellite network interface 114A-1 goes down or is no longer operational, the overlay network 108 for the first UAS vehicle 102A in the design depicted in FIG. 2B will remain up and communication will remain because the other interfaces can handle the traffic. This reliability is necessary to maintain efficient communication between the devices in the network, thus, ensuring important safety data is relayed to the management server 106 for UTM purposes.

Additionally, one of the purposes of the virtual network interfaces is also for helping to provide reliability and efficiency. Typically, when a network device has multiple network interfaces, each interface has a different IP address and network packets sourced from and sent out each interface has a source IP address of the respective network interface that the network packet is leaving from. For example, if a network device has two network interfaces and each one is assigned a different IP address, for example, network interface 1 has IP address 10.10.10.1/24 and network interface 2 has an IP address 10.10.10.2/24, then IP packets sent out network interface 1 will have a source IP address of 10.10.10.1 and IP packets sent out network interface 2 will have a source IP address of 10.10.10.2. However, if the link in network interface 1 goes down and IP address 10.10.10.1 is no longer reachable, this can cause packet loss and inefficiency in the network if network traffic has a destination IP address of 10.10.10.1. The above hypothetical represents a network where the IP address of the network interfaces are all in the same subnet. As discussed above, the present subject matter is not limited to only a single subnet.

One way to combat this issue is by giving the device that network interface 1 and network interface 2 are a part of a virtual network interface and source the packets from there. Let's say, in this hypothetical, the virtual network interface is given the IP address 10.10.5.1/24 and the rest of the network is configured to be able to route to that IP address through either the first network interface or the second network interface (without creating a loop) then if either the first network interface or the second network interface goes down, packet loss will not occur because one of the interfaces remained up to accept to the traffic to the virtual network interface.

The above principle applies to the present disclosure. As described above, each of the first UAS vehicle 102A, the second UAS vehicle 102B (as well as any other UAS vehicle that is a part of the system), and the management gateway 104 each have a respective virtual network interface configured with IP addresses in the same subnet with each other and used to communicate with each other over the overlay network 108. In this way, if traffic is sent using, as a source IP address, the IP address of the virtual network interfaces, instead of the IP address of the physical interfaces, such as satellite interface 114A-1, then the traffic will not be lost because it can be sent out or received on one or multiple of the other remaining physical interfaces. Additionally, return traffic that would normally have a destination IP address of the down satellite interface 114A-1 would be lost. However, with a destination IP address of the first virtual network interface 112A, the traffic would be routed to the first UAS vehicle 102A via one or multiple of the other interfaces up and available, such as first cellular network interface 114A-2.

In any event, network packets being transmitted through the various wireless network interfaces 114A, are each sent out a respective one of the available and active network interfaces 114A according to a coded multiplex algorithm, being applied to the original application network packets. It should be noted that, in some embodiments, the system described herein has redundancy algorithms in place such that, if any coded network packets (i.e., application network packets that have been coded using the coded multiplex algorithm) are lost during transfer, the original application network packets will still be received at the destination. Additionally, assuming all of the network interfaces, except the first vehicle-to-vehicle network interface 114A-4 was down, the first UAS vehicle 102A would still be able to forward the traffic to the management server 106 (and vice-versa) through the first vehicle-to-vehicle network interface 114A-4 and second vehicle-to-vehicle network interface 114B-4. In some embodiments of the present disclosure, using the first vehicle-to-vehicle network interface 114A-4 and/or the second vehicle-to-vehicle network interface 114B-4, the UAS vehicles 102 are configured such that they can send the network packets to each other. In this embodiment, the receiving UAS vehicle 102 can either operate as the management server, itself, or it can then forward the network packets to the separate management server 106. In other words, the entire system of the present description, including the UAS gateways 110, management gateway 104, and the management server 106, can all be located on and operated by a plurality of UAS vehicles 102.

In some embodiments of the present disclosure, the overlay network 108 can be formed and/or maintained over all of the available physical network interfaces 114A-1 through 114A-4 and 114B-1 through 114B-4. In some embodiments, the overlay network 108 can be formed over one or more or a subset of the available physical network interfaces 114A-1 through 114A-4 and 114B-1 through 114B-4. In some embodiments, keeping up the overlay network 108 does not require direct maintenance. In some embodiments, the overlay network 108 is assumed to be alive after setup. Respective underlying network service providers may perform transparent maintenance for individual access networks. In some other embodiments, the overlay network can be maintained using keepalive messages. Those having ordinary skill in the art will appreciate that in this scenario, the keepalive messages can be exchanged by the various devices and those that respond will remain in the overlay and those that do not will be deemed as unreachable and removed from the overlay until their keepalive messages are received.

Additionally, the overlay network 108 is configured to maintain address points (IP addresses) of all available network interfaces, which are assigned by respective service providers, in a database of IP addresses. If these IP addresses change dynamically, the overlay network 108 is configured to update the database of IP addresses of the available network interfaces with new IP address information. In some embodiments, the system 100 is configured to communicate network packets over or through the overlay network 108 between the UAS vehicles 102 and the management server 106. In some embodiments, the underlying physical interfaces 114 are shielded from the applications 120, meaning the applications 120 are not aware of the physical interfaces 114 and only communicate with the virtual network interface 112. Thus, in some embodiments, the communication through the physical interfaces 114 is transparent to the applications 120.

Figure 2C:
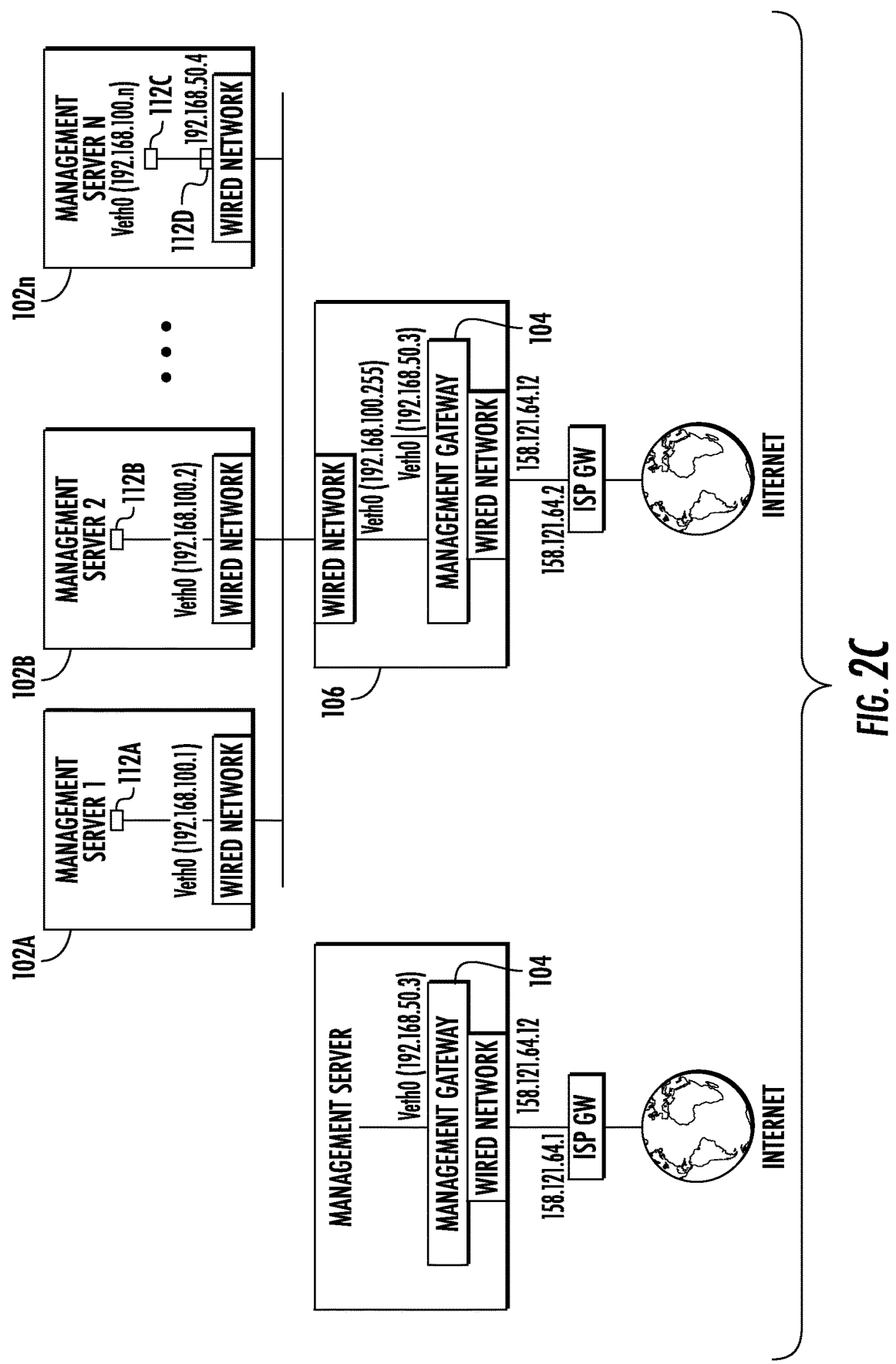

Referring to FIG. 2C, which illustrates network diagrams showing various topologies in which the management gateway 104 and one or more management servers 106 can be set up. For example, on the left diagram (i.e., diagram furthest from the page number) of FIG. 2C, the management server 106 and the management gateway 104 are combined into the same network device and share a common virtual network interface 112. This topology is described above. However, as shown on the right diagram of FIG. 2C (i.e., diagram closest to the page number), in some embodiments, there can be multiple management servers 106A-106N, each with a corresponding virtual network interface 112 with a different IP address, and a single management gateway 104 with a corresponding virtual network interface 112 as well.

Figure 2D:
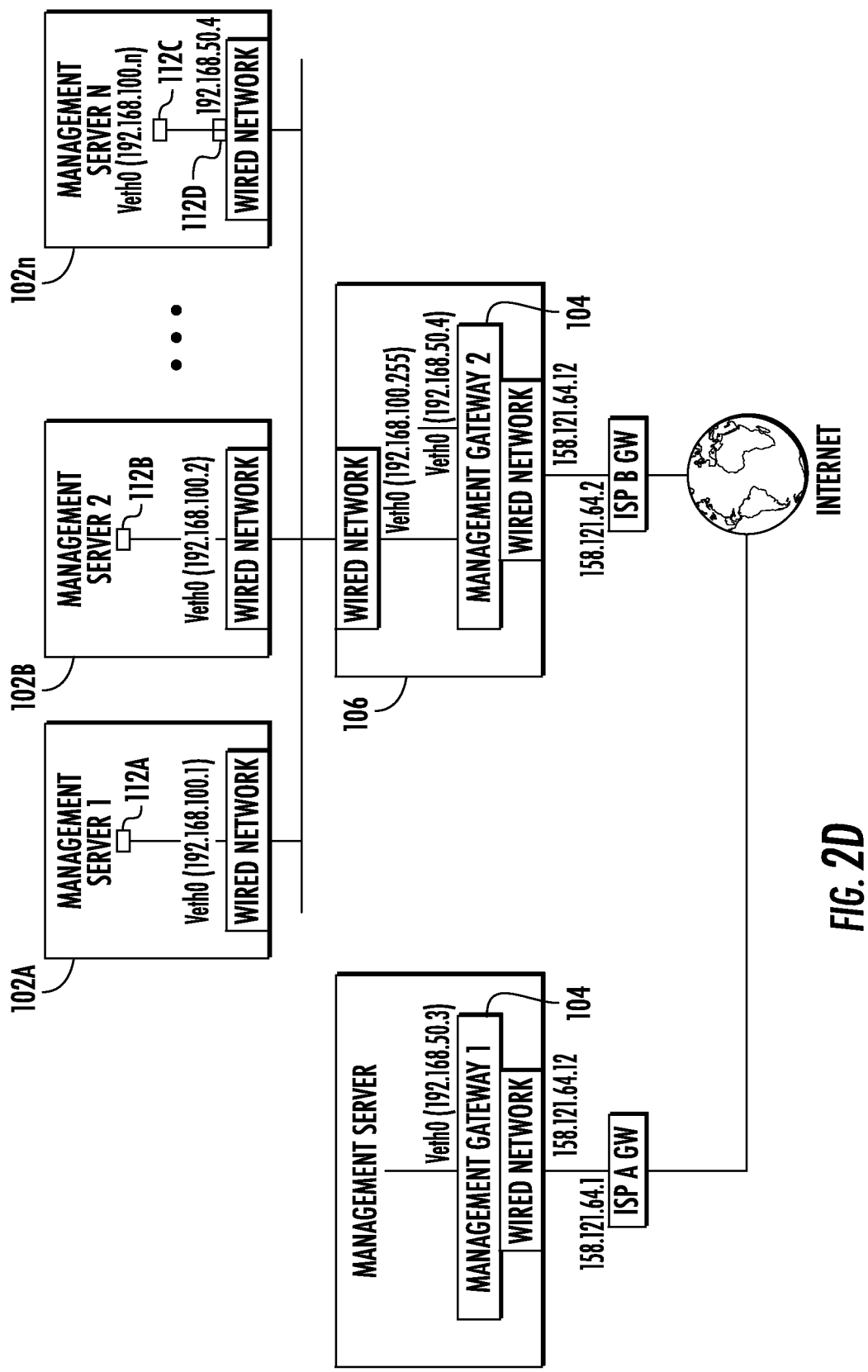

Referring to FIG. 2D, which illustrates a network topology where a combined management server 106 and management gateway 104 is connected, via the Internet, to another management gateway 104 handling a series of other management servers 106. In this scenario, both the server processing and management gateway processing can be performed in a distributed manner. In this way, the server and gateway functions can be performed in different physical locations in a distributed manner.

Figure 3:
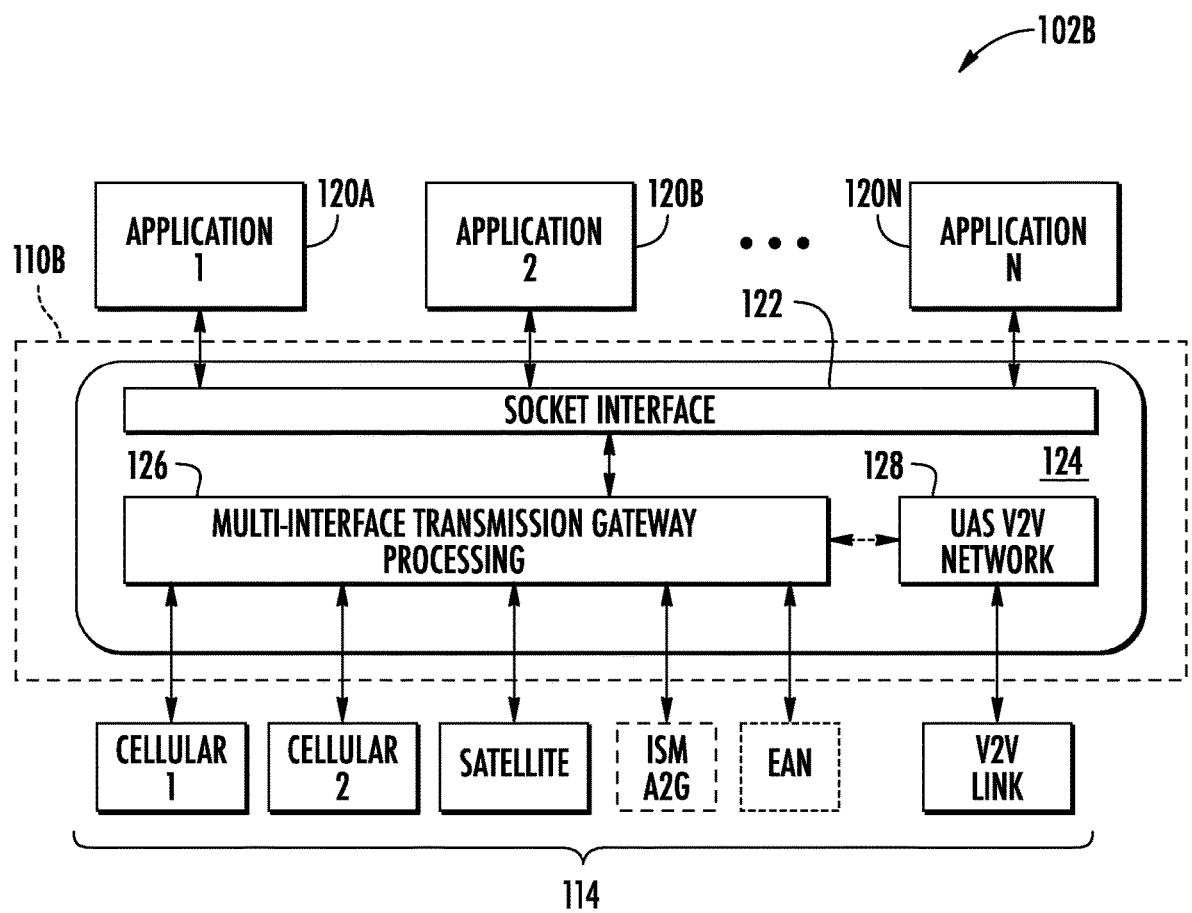
FIG. 3 illustrates a block diagram of some of the major components of the system according to embodiments of the present disclosure.

Referring to FIG. 3, which illustrates a block diagram of various systems operating on the second UAS vehicle 102B such as some systems operating in the second UAS gateway 110B. As discussed herein, the UAS gateways can comprise one or more processors, non-transitory computer readable medium, and executable instructions configured to operate as a networking gateway for the various UAS vehicles 102. Additionally, the second UAS gateway 110B can operate as a general processor that can, in addition to acting as the second UAS gateway 110B, be configured to operate various applications that are used to communicate between, for example and without limitation, the second UAS vehicle 102B and the management server 106. The applications can also be configured to communicate with various other devices and servers that can be reached via the Internet.

For example and without limitation, each UAS gateway, such as second UAS gateway 110B, can operate multiple applications, such as application 1 120A, application 2 120B, and any number of applications up to application N 120N, meaning any number of applications, not applications A through N using the alphabet. Each of these applications can communicate with various devices as discussed above. However, in the context of the present application, one or more of the applications are configured to communicate UTM parameters to the management server. Some of these communications include packets carrying data for 1) informing the UTM/management server about in-flight route planning and re-planning; 2) reporting, sharing, and monitoring routine flight statuses; and 3) handling contingencies or emergencies remotely. These safety critical pieces of data are configured to be sent by one or more of application 1 120A, application 2 120B, or any other of the applications up to application N 120N.

In some embodiments, the second UAS gateway 110B comprises a processing infrastructure 124 that helps to take application network packets from the applications 120, code them, as discussed herein, into coded network packets, and put the coded network packets on the wireless network interfaces 114. In some embodiments, the processing infrastructure comprises a socket interface 122 that that is configured to connect the applications 120 with the rest of the processing infrastructure 124. As application network packets are created by the applications 120 they are forwarded to the processing infrastructure 124 via the socket interface 122 and then transmitted to the multi-interface transmission gateway processing module 126 that is configured to process the application network packets, coding them into coded network packets, and send the coded network packets out either of the network interfaces 114 based on the availability of each individual interface 114. In addition, the multi-interface transmission gateway processing module 126 is configured to transmit coded network packets to the UAS vehicle-to-vehicle network module 128 in the event that the second UAS gateway 110B needs to transmit packets out the V2V interface/link.

In some embodiments, the various modules described above are integrated into a single processing module or a single processing chip, having multiple processors on it. In some further embodiments, the various modules are separate processors on a single or multiple printed circuit boards (PCBs). In some embodiments, some or all of the functions described above can be performed by other circuits such as controllers, application specific integrated circuits (ASICs), various switches, and other circuitry. In some embodiments, there is one set of processors (or other circuitry) and modules described above, collectively for all of the applications. In some other embodiments, there is a set of processors (or other circuitry) and modules described above, one set for each application. In other words, the processing of the packets can be performed centrally in one set of processors/modules or in a distributed manner using multiple processors/modules.

Figure 4A:
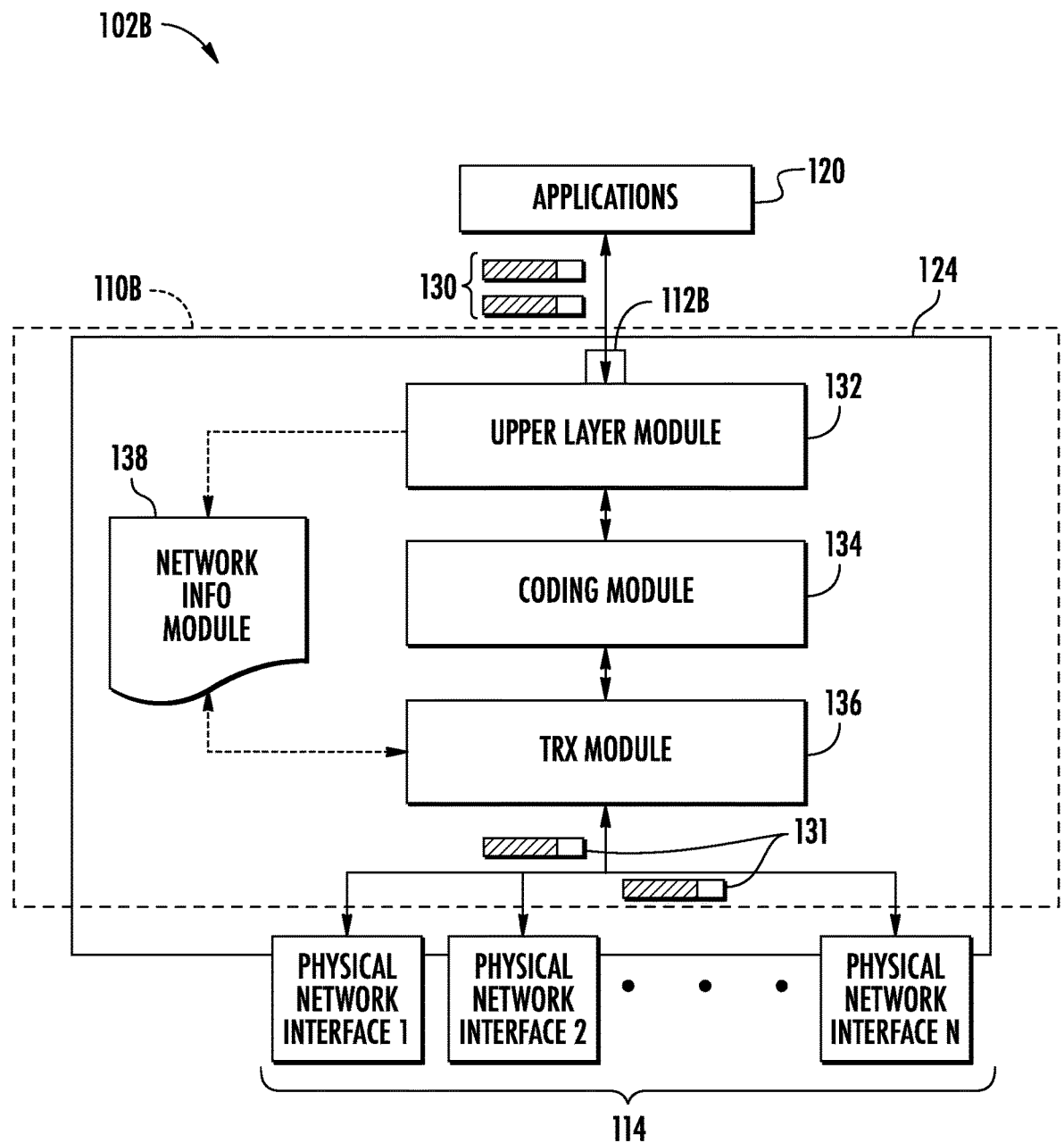
FIG. 4A, FIG. 4B, and FIG. 4C illustrate example block diagrams of some of the major components of the system according to embodiments of the present disclosure.

Referring to FIG. 4A, which illustrates a block diagram of the software architecture of the second UAS gateway 110B. Although this description is made with respect to the second UAS gateway 110B, those having ordinary skill in the art will appreciate that the description herein can be applied to any or all of the UAS gateways 110 of the UAS 102. In some embodiments, the processing infrastructure 124 comprises various processors and modules configured to handle traffic communicating between each of the UAS vehicles and various other devices, including the management server 106. In addition, the software architecture described herein, of the second UAS gateway 110B is likewise applicable to the software architecture of the management gateway 104. If the management gateway 104 and the management server 106 are combined into the same network device, the processing architecture of the combined network device can be configured to have the same or similar processing infrastructure 124 of the second UAS gateway 110B. In some embodiments, the procedures performed by the second UAS gateway 110B on network packets being transmitted to the management server 106, the management server 106 and/or the management gateway 104 are configured to perform the same actions on packets being sent from the management server 106 and the second UAS gateway 110B. Likewise, the actions performed by the second UAS gateway 110B on received packets is also performed by the management server 106 and/or the management gateway 104. In some embodiments, the processing infrastructure 124, in addition to the modules and devices described above with respect to FIG. 3 above, comprises an upper layer module 132, a coding module 134, a TRX module 136, and a network information module 138. Each of these modules can be implemented using one or more software subroutines, one or more software programs, one or more processors comprising non-transitory computer readable medium, one or more ASICs, or other circuitry configured to perform the functions described herein.

Figure 4B:
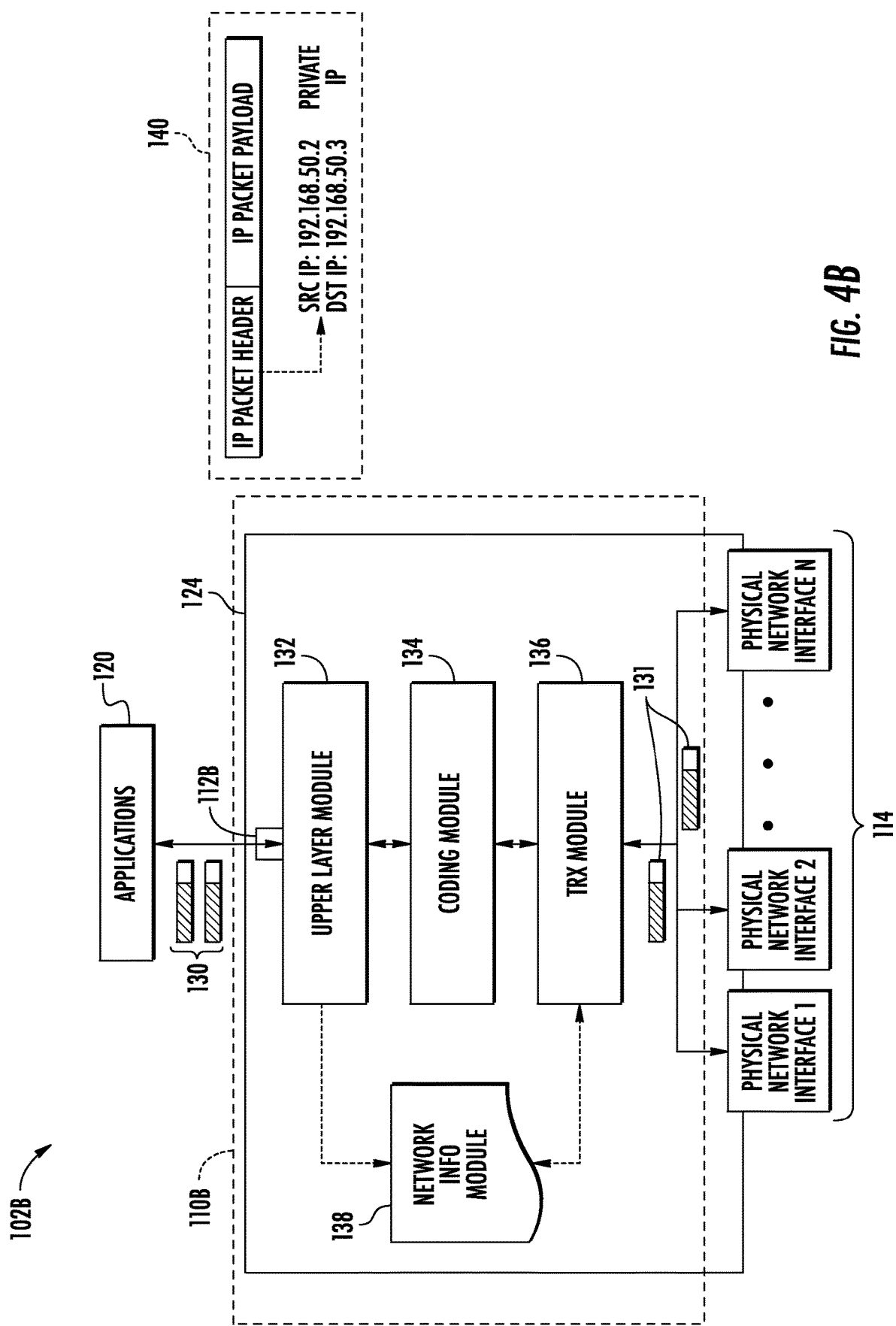

As illustrated in FIG. 3 and FIG. 4A, the applications 120 have a connection to the processing infrastructure via the socket interface 122 and the upper layer module 132 first handles any application network packets 130 sent from the applications 120. The upper layer module 132, implements and maintains virtual network interface (i.e., second virtual network interface 112B), that is for example and without limitation, a Linux based virtual network interface. In this particular case, as indicated in FIG. 3, the IP address of the second virtual network interface 112B is 192.168.50.2. In other words, application network packets 130 being transmitted by the applications aboard the second UAS vehicle 102B, in the context of the present application, have a source IP address of 192.168.50.2. Referring to FIG. 4B, which illustrates the same block diagram as FIG. 4A, but shows the packet header details 140 for the application network packets 130 being sent by the applications 120. As the application network packets 130 are sent from the applications 120 to the management server 106 (i.e., which has a virtual IP address of 192.168.50.3), as shown by the packet header details 140, the source IP address of the application network packets 130 is 192.168.50.2, indicating the second virtual interface 112B is the source of the application network packets 130. In some embodiments, any of the UAS vehicles can have one or more virtual interfaces 112. In a case where a UAS vehicle has more than one virtual interfaces 112 it is likely that the IP address of each virtual interface 112 would need to be different.

In some embodiments, the upper layer module 132 is also configured to handle transferring received network packets from the processing infrastructure 124 to the applications. In those instances, the source IP address of the network packets would be 192.168.50.3, if it is sent by the management server 106, and the destination IP address of the network packets would be 192.168.50.2.

In some embodiments, the processing infrastructure 124 comprises a coding module 134. In some embodiments, the coding module is configured to encode transmitting coded network packets 131 and/or decode received coded network packets over multiple network interfaces. In the encoding procedure, the coding module 134 is configured to encode the application network packets 130 before transmitting them to the management server 106. In some embodiments, encoding the transmitting application network packets 130 comprises mapping each application network packet 130 to one or more coded symbols. The coded symbols are essentially representations for subsets of a corresponding network packet. In some embodiments, the coded symbols are then inserted into one or more new network packets, referred to as coded network packets. In this way, essentially each of the originally transmitted application network packets 130 are mapped into the one or more coded symbols which are then encapsulated into the coded network packets 131. Once the originally transmitted application network packets 130 are encapsulated into the coded network packets 131, they are then forwarded to the TRX module 136 for further processing before being sent out one or more of the network interfaces 114. As described above, the interface that each coded packet is sent out is based on a coded multiplex algorithm, which determines, from the available interfaces (i.e., which wireless network interfaces 114 are operational and can transmit packets) the interface each network packet is sent out.

With respect to the mapped coded symbols that are encapsulated into the new packets 131, the parameters that determine how many symbols can be inserted into a single coded network packet 131 can be modified due to current channel, traffic, and network conditions. In this context, it is also possible to take entire originally transmitted application network packets 130 and insert one or more of them into jumbo packets, which are then encoded, and the coding module 134 of the receiving device (i.e., the management gateway 104 or the second UAS gateway 110B) is configured to extract and decode the originally transmitted application network packets 130 from the jumbo packets. When symbols are used in the coding/decoding process, the symbol size and mapping of the symbols may depend on conditions of the network, but also on the specific coding technique used, as well as other parameters of the coding itself.

In some embodiments, multiple coding schemes can be used. For example and without limitation, to achieve higher throughput, multiplexing of the coded symbols can be used. In some embodiments, each application network packet can be encoded, and a complete copy of the original packet information is included in each coded network packet and sent out the physical network interfaces 114. This improves the diversity of the network transmission, ensuring a higher likelihood of the traffic reaching its destination. In some embodiments, a combination of multiplexing and diversifying the network packets can be used to obtain the benefits of both redundancy (i.e., the same packet information over multiple different interfaces) and throughput. In some embodiments, erasure coding schemes can be used for arbitrary added redundancy data in an opportunistic fashion. In this approach, coded network packets comprising the coded symbols are transmitted over multiple physical interfaces 114 until enough information has been received to put together the original application network packets 130 at the receiving end.

Similarly, when network packets are received at the second UAS gateway 110B from the management server 106 they have been encoded using the same process described above. Thus, they need to be decoded by the coding module 134. In some embodiments, the coding module 134 is configured to decode received network packets by extracting the multiple coded symbols from the received network packets to recover the application network packets that were sent by the management server 106. In some embodiments, the coding module 134 is configured to decode the received and extracted network packets using erasure decoding. The coding module 134 is then configured to forward the recombined original packets received from the management server 106 to the upper layer module 132 to be processed and sent to the appropriate application 120. In the event that there are any duplicates of the original source packets received, the duplicates are silently dropped by the coding module 134. In some embodiments, the management gateway 104 comprises a coding module 134 as well and is configured to perform the same encoding and/or decoding actions as described above.

In some embodiments, the erasure decoding can be performed using, for example and without limitation, an LT code. However, those having ordinary skill in the art will appreciate that other types of erasure codes can be used as well, including, for example, online codes and other Forward Error Correcting methods. Any erasure code that allows coded symbols to be inserted into the new packets and then opportunistically decoded at the receiver is acceptable.

Figure 4C:
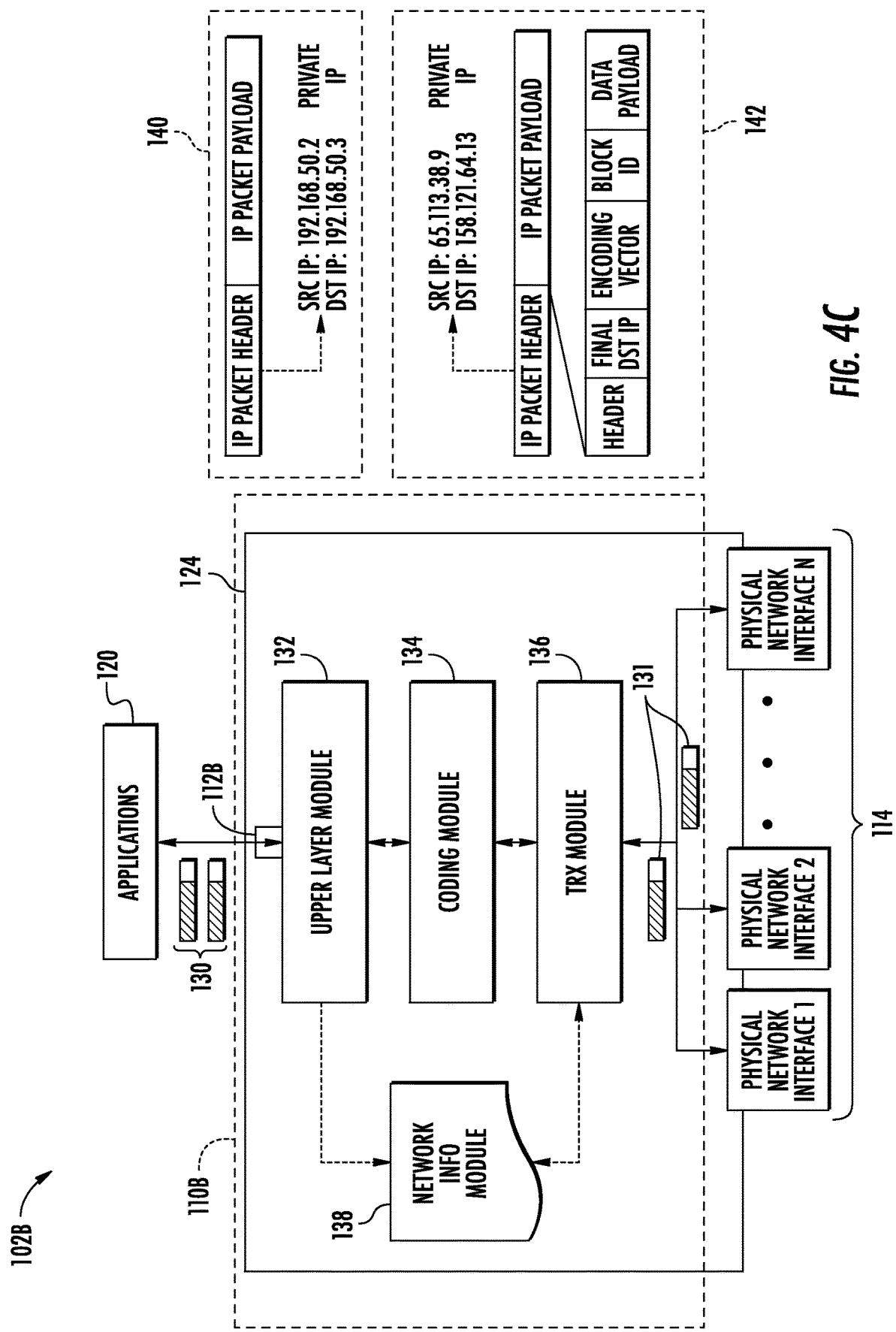

Referring to FIG. 4C, which illustrates the same block diagram as FIG. 4A and FIG. 4B, the encoded packet header details 142 show that after the application network packets 130 are broken down into the symbols, they are stored in the IP packet payload of the coded network packets 131, the coded network packets 131 having a source IP address of the respective IP address of the physical network interface they are egressing, 65.113.38.9, and a destination IP address of the management gateway 104, 158.121.64.13. Although the particular illustration in FIG. 4C shows the management gateway with the destination IP address, in some embodiments, the management server 106 could own the IP address/interface that the coded network packets 131 have as their destination IP address. In other words, the management gateway 104 or the management server 106 could receive the traffic first. This is so because the management server 106 and management gateway 104 can be operated on the same server or same network device. Once the management gateway 104 or the management server 106 receives the coded network packets 131 with the encoded packets, the management gateway 104 or the management server 106 are configured to decode the coded network packets as described above using a coding module 134 of the management server 106 or management gateway 104.

In some embodiments, the processing infrastructure 124 further comprises a TRX module 136 configured to interact with the multiple network interfaces 114 and shields them from the applications 120 running on the second UAS gateway 110B. What is meant by this "shielding" is that network packets that are received by the multiple network interfaces 114 are not immediately processed and received by the applications 120. The processing infrastructure 124 first handles the incoming network packets at the TRX module 136, which is configured to inspect the packets and pass/forward them, to the coding module 134 for decoding. The TRX module 136 is responsible for transmitting the egressing networking packets 131 out available physical network interfaces 114 and for receiving the incoming network packets from the management server 106 (as well as any other devices sending network packets to the second UAS vehicle 110B via the overlay network 108).

Additionally, in some embodiments, the processing infrastructure 124 can comprise a network information module 138 configured to provide information about available networks (over the multiple network interfaces 114) to the various other modules, including the upper layer module 132, the coding module 134, and the TRX module 136. In some embodiments, the network information module 138 is configured to map using a one-to-many approach. In other words, the one receiver virtual network interface IP address (which is the destination IP address of a packet being sent) can lead to a set of physical addresses on that node. Based on the physical address to be used by the sender, one of the physical addresses will be used for a packet to be sent.

In some embodiments, some or all of the upper layer module 132, the coding module 134, the TRX module 136, and the network information module 138 can be combined into a single module, performed by the same software program, processor, subroutine, ASIC, etc.

Figure 5A:
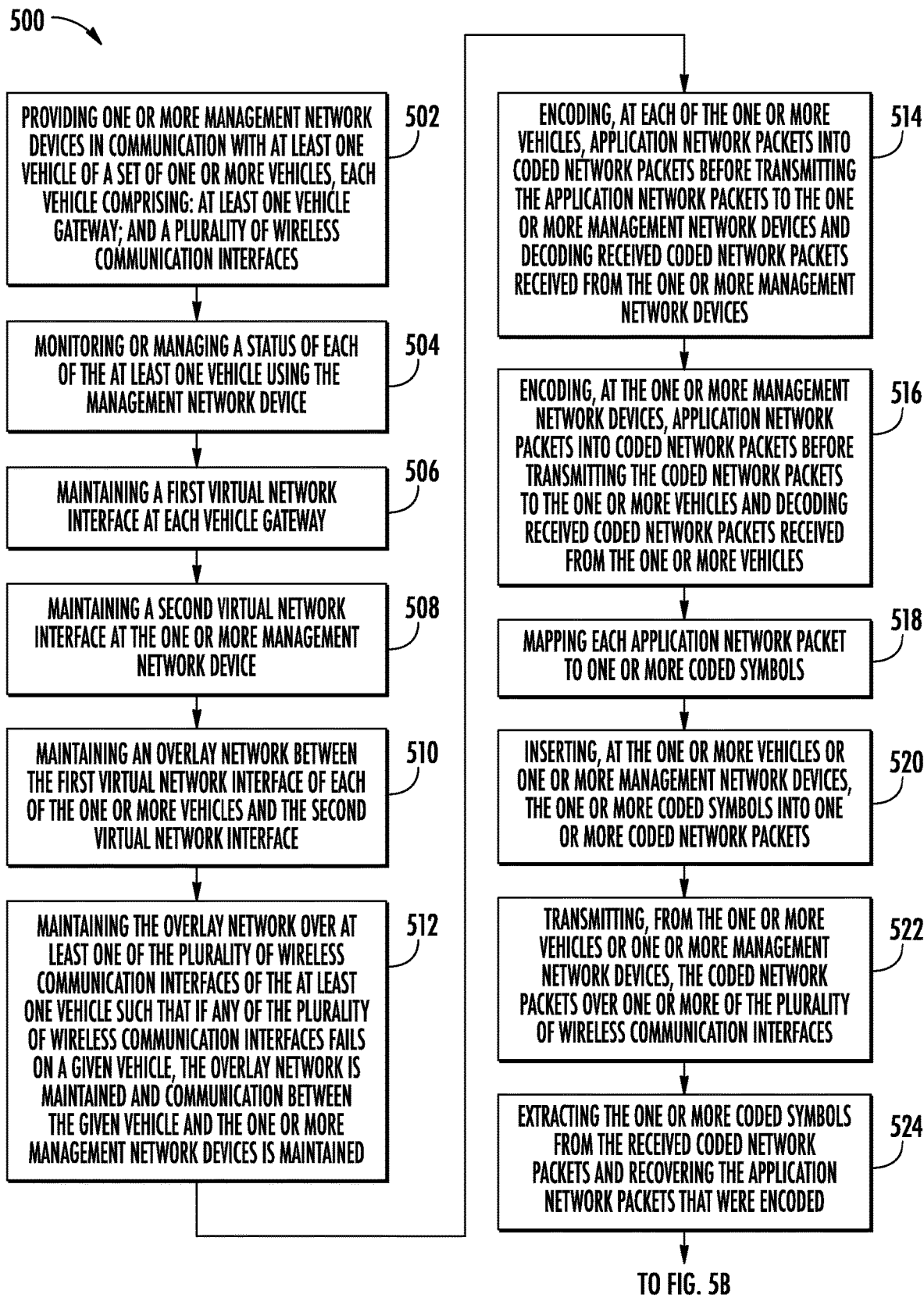
FIG. 5A and FIG. 5B illustrate flow charts of example steps of a method according to embodiments of the present disclosure.
Figure 5B:
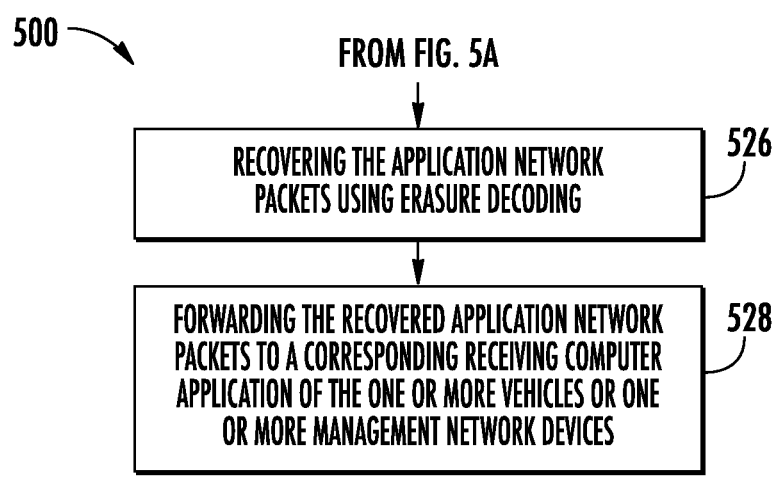

Referring to FIG. 5A, which illustrates a flow chart 500 of an example method of some embodiments of the present disclosure. Those having ordinary skill in the art will appreciate that various steps in the process can occur out of the described order and some steps can be optional, depending on the nature of the step in the process. In some embodiments, the first step 502 in the method comprises providing one or more management network devices in communication with at least one vehicle of a set of one or more vehicles, each vehicle comprising: at least one vehicle gateway; and a plurality of wireless communication interfaces. The second step 504 in the method comprises monitoring or managing a status of each of the at least one vehicle using the management network device. The third step 506 in the method comprises maintaining a first virtual network interface at each vehicle gateway. In some embodiments, the fourth step 508 in the method comprises maintaining a second virtual network interface at the one or more management network device.

The fifth step 510 in the method comprises maintaining an overlay network between the first virtual network interface of each of the one or more vehicles and the second virtual network interface. The sixth step 512 in the method comprises maintaining the overlay network over at least one of the plurality of wireless communication interfaces of the at least one vehicle such that if any of the plurality of wireless communication interfaces fails on a given vehicle, the overlay network is maintained and communication between the given vehicle and the one or more management network devices is maintained.

The seventh step 514 in the method comprises encoding, at each of the one or more vehicles, application network packets into coded network packets before transmitting the application network packets to the one or more management network devices and decoding received coded network packets received from the one or more management network devices. In some embodiments, the eighth step 516 in the method comprises encoding, at the one or more management network devices, application network packets into coded network packets before transmitting the coded network packets to the one or more vehicles and decoding received coded network packets received from the one or more vehicles. The ninth step 518 in the method comprises mapping each application network packet to one or more coded symbols. The tenth step 520 in the method comprises inserting, at the one or more vehicles or one or more management network devices, the one or more coded symbols into one or more coded network packets. In some embodiments, the eleventh step 522 in the method comprises transmitting, from the one or more vehicles or one or more management network devices, the coded network packets over one or more of the plurality of wireless communication interfaces.

The twelfth step 524 in the method comprises extracting the one or more coded symbols from the received coded network packets and recovering the application network packets that were encoded. Furthermore, in some embodiments, the thirteenth step 526 of the method comprises recovering the application network packets using erasure decoding. The fourteenth step 528 of the method comprises forwarding the recovered application network packets to a corresponding receiving computer application of the one or more vehicles or one or more management network devices.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A system for multi-interface transmission gateway processing comprising:
    one or more vehicles, each comprising:
        at least one vehicle gateway; and
        a plurality of wireless communication interfaces; and
    a management network device in communication with at least one vehicle of the one or more vehicles via concurrent communication with each interface of the plurality of wireless communication interfaces of the at least one vehicle;
    wherein the management network device is configured to monitor or manage a status of at least one vehicle of the one or more vehicles.

2. The system of claim 1, wherein each vehicle gateway is configured to maintain a first virtual network interface and the management network device is configured to maintain a second virtual network interface.

3. The system of claim 2, wherein the system is configured to maintain an overlay network between the first virtual network interface of at least one of the one or more vehicles and the second virtual network interface.

4. The system of claim 3, wherein the system is configured to maintain the overlay network over each interface of the plurality of wireless communication interfaces of the at least one vehicle such that if any of the plurality of wireless communication interfaces fails on a given vehicle, the overlay network is maintained and communication between the given vehicle and the management network device is continuously maintained.

5. The system of claim 4, wherein computer applications communicating between the at least one vehicle and the management network device, including communications configured for monitoring and managing the status of the at least one vehicle, are configured to communicate, using network packets, over the overlay network between the first virtual network interface of the at least one vehicle and the second virtual network interface of the management network device using network packets.

6. The system of claim 1, wherein the management network device comprises at least one of the one or more vehicles, a management server, or a management gateway.

7. The system of claim 1, wherein computer applications communicating between the at least one vehicle and the management network device are configured to create application network packets;
    wherein each of the one or more vehicles is configured to encode the application network packets into coded network packets before transmitting the coded network packets to the management network device and decode received coded network packets received from the management network device; and
    wherein the management network device is configured to encode the application network packets into coded network packets before transmitting the coded network packets to the one or more vehicles and decode received coded network packets received from the one or more vehicles.

8. The system of claim 7, wherein the one or more vehicles and the management network device are each configured to encode the application network packets by mapping each application network packet to one or more coded symbols;
    wherein the one or more vehicles and the management network device are further configured to insert the one or more coded symbols into one or more coded network packets; and
    wherein the one or more vehicles and the management network device are further configured to transmit the coded network packets over one or more of the plurality of wireless communication interfaces.

9. The system of claim 8, wherein the one or more vehicles and the management network device are each configured to decode received coded network packets by extracting the multiple coded symbols from the received coded network packets to recover the application network packets that were encoded into one or more coded symbols; and
    wherein the system is configured to recover the application network packets using erasure decoding and then forward the recovered application network packets to a corresponding receiving computer application.

10. The system of claim 1, wherein each of the one or more vehicles is a drone, an unmanned aerial system, an unmanned system, or any manned or unmanned autonomous system that requires reliable communications with one or more remote management network devices.

11. The system of claim 1, wherein the plurality of wireless communication interfaces comprises one or more of the following: one or more cellular wireless network interfaces, one or more satellite network interfaces, one or more vehicle-to-vehicle network interfaces, one or more air-to-ground network interfaces, and one or more Wi-Fi network interfaces.

12. A method for multi-interface transmission gateway processing comprising:
    providing a management network device in communication with at least one vehicle of a set of one or more vehicles, each vehicle comprising:
        at least one vehicle gateway; and
        a plurality of wireless communication interfaces; and
    monitoring or managing a status of each of the at least one vehicle using concurrent communication between the management network device and each interface of the plurality of wireless communication interfaces of the at least one vehicle.

13. The method of claim 12, further comprising:
    maintaining a first virtual network interface at each vehicle gateway; and maintaining a second virtual network interface at the management network device.

14. The method of claim 13, further comprising maintaining an overlay network between the first virtual network interface of each of the one or more vehicles and the second virtual network interface.

15. The method of claim 14, further comprising maintaining the overlay network over each interface of the plurality of wireless communication interfaces of the at least one vehicle such that if any of the plurality of wireless communication interfaces fails on a given vehicle, the overlay network is maintained and communication between the given vehicle and the management network device is continuously maintained.

16. The method of claim 15, wherein computer applications communicating between the at least one vehicle and the management network device, including communications configured for monitoring and managing the at least one vehicle, are configured to communicate, using network packets, over the overlay network between the first virtual network interface of a corresponding vehicle and the second virtual network interface of the management network device.

17. The method of claim 12, wherein the management network device comprises at least one of the one or more vehicles, a management server, or a management gateway.

18. The method of claim 12, further comprising:
creating, by computer applications, application network packets to be communicated between the at least one vehicle and the management network device;
encoding, at each of the one or more vehicles, the application network packets into coded network packets before transmitting the coded network packets to the management network device and decoding received coded network packets received from the management network device; and
encoding, at the management network device, the application network packets into coded network packets before transmitting the coded network packets to the one or more vehicles and decoding received coded network packets received from the one or more vehicles.

19. The method of claim 18, wherein encoding comprises:
mapping each of the application network packets to one or more coded symbols;
inserting, at the one or more vehicles or the management network device, the one or more coded symbols into one or more coded network packets; and
transmitting, from the one or more vehicles or the management network device, the coded network packets over one or more of the plurality of wireless communication interfaces.

20. The method of claim 19, wherein decoding further comprises:
extracting the one or more coded symbols from the received coded network packets and recovering the application network packets that were encoded;
recovering the application network packets using erasure decoding; and
forwarding the recovered application network packets to a corresponding receiving computer application of the one or more vehicles or the management network device.

21. The method of claim 12, wherein each of the one or more vehicles is a drone, an unmanned aerial system, an unmanned system, or any manned or unmanned autonomous system that requires reliable communications with one or more remote management network devices.

22. The method of claim 12, wherein the plurality of wireless communication interfaces comprises one or more of the following: one or more cellular wireless network interfaces, one or more satellite network interfaces, one or more vehicle-to-vehicle network interfaces, one or more air-to-ground network interfaces, and one or more Wi-Fi network interfaces.

* * * * *